(12) United States Patent
Fliedner

(10) Patent No.: US 11,982,323 B2
(45) Date of Patent: May 14, 2024

(54) ELECTROMAGNETIC BRAKE OR CLUTCH

(71) Applicant: KEB AUTOMATION KG, Barntrup (DE)

(72) Inventor: Jan Berent Fliedner, Detmold (DE)

(73) Assignee: KEB AUTOMATION KG, Barntrup (DE)

( * ) Notice: Subject to any disclaimer, the term of this patent is extended or adjusted under 35 U.S.C. 154(b) by 0 days.

(21) Appl. No.: 18/122,765

(22) Filed: Mar. 17, 2023

(65) Prior Publication Data
US 2023/0296140 A1   Sep. 21, 2023

(30) Foreign Application Priority Data
Mar. 17, 2022   (EP) .................................... 22162800

(51) Int. Cl.
*F16D 27/112* (2006.01)

(52) U.S. Cl.
CPC .................................. *F16D 27/112* (2013.01)

(58) Field of Classification Search
CPC ....... F16D 27/01; F16D 27/112; F16D 27/115
See application file for complete search history.

(56) References Cited

U.S. PATENT DOCUMENTS

| 3,314,512 A | 4/1967 | Kerestury |
| 6,578,689 B2 | 6/2003 | Kawada et al. |
| 8,910,767 B2 * | 12/2014 | Kita ...................... H02K 7/1085 |
| | | 192/84.961 |
| 2003/0196863 A1 * | 10/2003 | Faller ...................... F01P 7/046 |
| | | 192/84.1 |
| 2009/0314600 A1 * | 12/2009 | Kato ...................... F16D 27/112 |
| | | 192/84.31 |

(Continued)

FOREIGN PATENT DOCUMENTS

| DE | 102014109125 B4 | 9/2016 |
| EP | 184 898 B1 | 7/1990 |

(Continued)

OTHER PUBLICATIONS

"What's the difference between hard and soft magnetic materials?" retrieved from www.powerelectronictips.com (Year: 2023).*

(Continued)

*Primary Examiner* — Stacey A Fluhart
(74) *Attorney, Agent, or Firm* — Harness, Dickey & Pierce, P.L.C.

(57) ABSTRACT

The disclosure relates to an electromagnetic brake or clutch having an electromagnet, a permanent magnet and an armature plate interacting with the electromagnet and the permanent magnet, which armature plate is arranged on a hub body so as to be non-rotatable but nevertheless axially displaceable, the electromagnet having a magnet housing and a coil received therein, wherein the magnet housing has, on the armature plate side, an outer ring body providing an external pole and an inner ring body providing an internal pole, characterized in that the inner ring body carries the permanent magnet on the armature plate side and that a web which serves as magnetic flux bridge and connects the inner ring body to the outer ring body is disposed between the inner ring body and the outer ring body.

9 Claims, 6 Drawing Sheets

(56) References Cited

U.S. PATENT DOCUMENTS

2011/0005883 A1* 1/2011 Krafft .................. H02K 49/043
                                                      310/105
2012/0111690 A1   5/2012 Kurosu et al.

FOREIGN PATENT DOCUMENTS

KR      20190075314 A      7/2019
WO      WO-2006122517 A2 * 11/2006  ............ F16D 27/112

OTHER PUBLICATIONS

"Definition of interacts" retrieved from https://dictionary.cambridge.org/dictionary/english/interact (Year: 2023).*

* cited by examiner

ELECTROMAGNETIC BRAKE OR CLUTCH

CROSS-REFERENCE TO RELATED APPLICATIONS

This application claims the benefit and priority of European Application No. 22162800.1, filed Mar. 17, 2022. The entire disclosure of the above application is incorporated herein by reference in its entirety.

FIELD

The disclosure relates to an electromagnetic brake or clutch having an electromagnet, a permanent magnet, and an armature plate interacting with the electromagnet and arranged on a hub body so as to be rotatable but nevertheless axially displaceable, the electromagnet comprising a magnet housing and a coil accommodated therein, the magnet housing having on the armature plate side an outer ring body providing an external pole and an inner ring body providing an internal pole.

BACKGROUND

Electromagnetic brakes or clutches of the kind described above are well known in prior art. Therefore, there is no need for separate printed proof at this point. For this reason, only EP 18448 898 B1 and DE 10 2014 109 125 B4 may be referred by way of example, each of which disclosing an electromagnetic brake or clutch of the kind described above.

EP 1 848 898 B1 relates to an electromagnetic brake having an external pole configured as an outer ring and an internal pole configured as an inner ring. The outer ring and the inner ring are spaced from each other in a radial direction and define an air gap therebetween. In this air gap between the inner ring and the outer ring a ring-shaped permanent magnet is disposed whose cross-sectional thickness between its inner diameter and its outer diameter is less than its axial dimension.

DE 10 2014 109 125 B4 discloses an electromagnetic pole-face friction clutch or pole-face friction brake having an external pole and an internal pole. A ring-shaped permanent magnet is arranged in a radial direction between the external pole and the internal pole. An armature plate interacts with the external pole or the internal pole, and both the external pole and the internal pole having a friction surface on the armature plate side which is provided with scores or grooves.

Although previously known electromagnetic brakes or clutches have proven themselves in everyday practical use, there is a need for improvement, especially with regard to the increased efficiency of electrical control. It therefore is an object of the present disclosure to further develop the design of an electromagnetic brake or clutch of the kind mentioned above in such a way that increased efficiency of the electrical control is possible.

SUMMARY

To achieve this object, the disclosure proposes an electromagnetic brake or clutch of the kind described above which is characterized in that the inner ring body carries the permanent magnet on the armature plate side and in that a web which serves as a magnetic field bridge and which connects the inner ring body to the outer ring body is arranged between the inner ring body and the outer ring body.

Differently from the design already known from prior art, the design according to the disclosure avoids a secondary air gap between the external pole provided by the outer ring body and the internal pole provided by the inner ring body. According to prior art, the ring-shaped permanent magnet as well as a secondary air gap separating these ring bodies are disposed between the outer ring body and the inner ring body. This secondary air gap increases the magnetic resistance between the external pole and the internal pole. A disadvantage here is that this secondary air gap reduces the efficiency of the coil and that nevertheless a part of the permanent magnetic flux is still conducted via this circuit without generating a force effect at the pole faces. This disadvantage of the prior art design is overcome by the design according to the disclosure.

The design according to the disclosure provides that the inner ring body carries the permanent magnet on the armature plate side and that a web which serves as magnetic flux bridge and connects the inner ring body to the outer ring body is arranged between the inner ring body and the outer ring body. The magnetic circuit of the coil of the electromagnet is accordingly configured without interruption, thus doing without a secondary air gap which is functionally routed in the working air gap between electromagnets or permanent magnets on the one hand and the armature plate on the other. This advantageously results in an increased efficiency of the electric control. In addition, the conflicting objectives of the prior art are eliminated, according to which a smaller secondary-air gap results in greater coil circuit efficiency and a larger secondary-air gap results in greater magnetic attraction force. As a consequence of the embodiment according to the disclosure, the available permanent magnet material can be used more efficiently, since no undesirable magnetic shunts are built up, thus reducing the amount of magnet material used and thus lowering costs. In addition, a better sealing and shielding of the coil space accommodating the coil of the electromagnet is achieved without further supplementary measures.

A further advantage of the design according to the disclosure is that the enclosure of the coil of the electromagnet forms a parallel branch to the web connecting the outer ring body to the inner ring body, so that the magnetically conductive cross-section in the permanent magnet circuit is increased, which ultimately results in more efficient use of the material forming the enclosure. In terms of design, this enables a reduced installation space as well as lower material costs.

As a result of the design according to the disclosure, both an increased efficiency of the electrical control and a more effective use of the material of the magnet housing of the electromagnet are achieved overall. This allows optimized use of installation space and a reduction in manufacturing costs, in particular through a saving in material costs.

According to a further feature of the disclosure it is provided that the inner ring body, the outer ring body, and the web are formed in one piece. This is an improved design compared to the state of the art, particularly in terms of manufacturing and assembly costs. In addition, it is possible in a simple manner to exert a targeted influence on the magnetic flux that occurs in the subsequent intended use by means of a corresponding geometric design, in particular by means of the geometric design of the web in the thickness direction.

According to a further feature of the disclosure it is provided that the magnet housing has a magnet pot which provides the inner ring body, the outer ring body and the web on the armature plate side. According to this preferred embodiment, the magnet pot as part of the magnet housing accommodates the coil of the electromagnet in the final assembled state. The magnet pot thus provides the coil space. On the armature plate side, the magnetic pot also serves to provide the inner ring body, the outer ring body and the web connecting the inner ring body to the outer ring body. A one-piece component is thus provided which serves both as an enclosure for the coil of the electromagnet and for providing the outer and inner poles. This also provides a simplified embodiment which is easy to manufacture and assemble and which also makes it possible to save installation space and thus also material.

According to a further feature of the disclosure it is provided that the magnetic pot is formed from a soft magnetic material. The coil space provided by the magnetic pot is thus separated from the permanent magnet by a soft magnetic material. This increases the magnetically conductive cross-section in the permanent magnet circuit, which leads to a more efficient use of the permanent magnet material.

According to a further feature of the disclosure, the magnetic pot is of a closed design on the armature plate side. "Closed" in this context means free from openings, in particular free from secondary-air gaps. This advantageously reduces the magnetic resistance between the magnetic poles of the permanent magnet. The thickness of the web connecting the inner ring body to the outer ring body in the axial direction can be used to set the direct magnetic flux occurring in the intended application. The thicker the web, i.e. the larger the web in the axial direction, the higher the direct magnetic flux.

According to a further feature of the disclosure it is provided that the outer ring body projects axially beyond the inner ring body in the direction of the armature plate. A stepped design is thus provided, with the inner ring body receding relative to the outer ring body in an axial direction leading away from the armature plate. This creates a kind of receiving space which accommodates er permanent magnet in the final assembled state.

According to a further feature of the disclosure it is provided that the permanent magnet carried by the inner ring body terminates flush with the outer ring body on the armature plate side. This creates an overall flat contact surface between the armature plate on the one hand and the outer ring body and permanent magnet on the other. The flush termination of the permanent magnet on the one hand and the outer ring body on the other is made possible because the outer ring body projects axially in relation to the inner ring body in the direction of the armature plate, creating the space for the permanent magnet.

According to a further feature of the disclosure it is provided that the permanent magnet and/or the outer ring body provide a friction surface interacting with the armature plate on the armature plate side. According to a further feature of the disclosure, this friction surface is provided by a friction facing which is applied to the permanent magnet and/or the outer ring body. The armature plate, too can be provided with a corresponding friction facing that provides the friction surface so that in the event of contact, the friction surfaces of the armature plate on the one hand and the permanent magnet or outer ring body on the other lie against each other.

According to a further feature of the disclosure it is provided that the permanent magnet is provided by a body whose axial dimension is smaller than its cross-section thickness between its inner diameter and its outer diameter. The ring body of the permanent magnet, which can also be segmented, thus has a surface normal that is parallel to the surface normal of the anchor plate. The large flat sides of the permanent magnet on the one hand and those of the armature plate on the other are thus aligned parallel to each other, which means that, in contrast to prior art, the ring-shaped permanent magnet is arranged rotated by 90°. Due to this arrangement of the permanent magnet in the magnetic circuit, which is different from prior art, the advantages already described above result.

DRAWINGS

Further advantages and features of the disclosure will become apparent from the following description with reference to the drawings.

Figure 1:
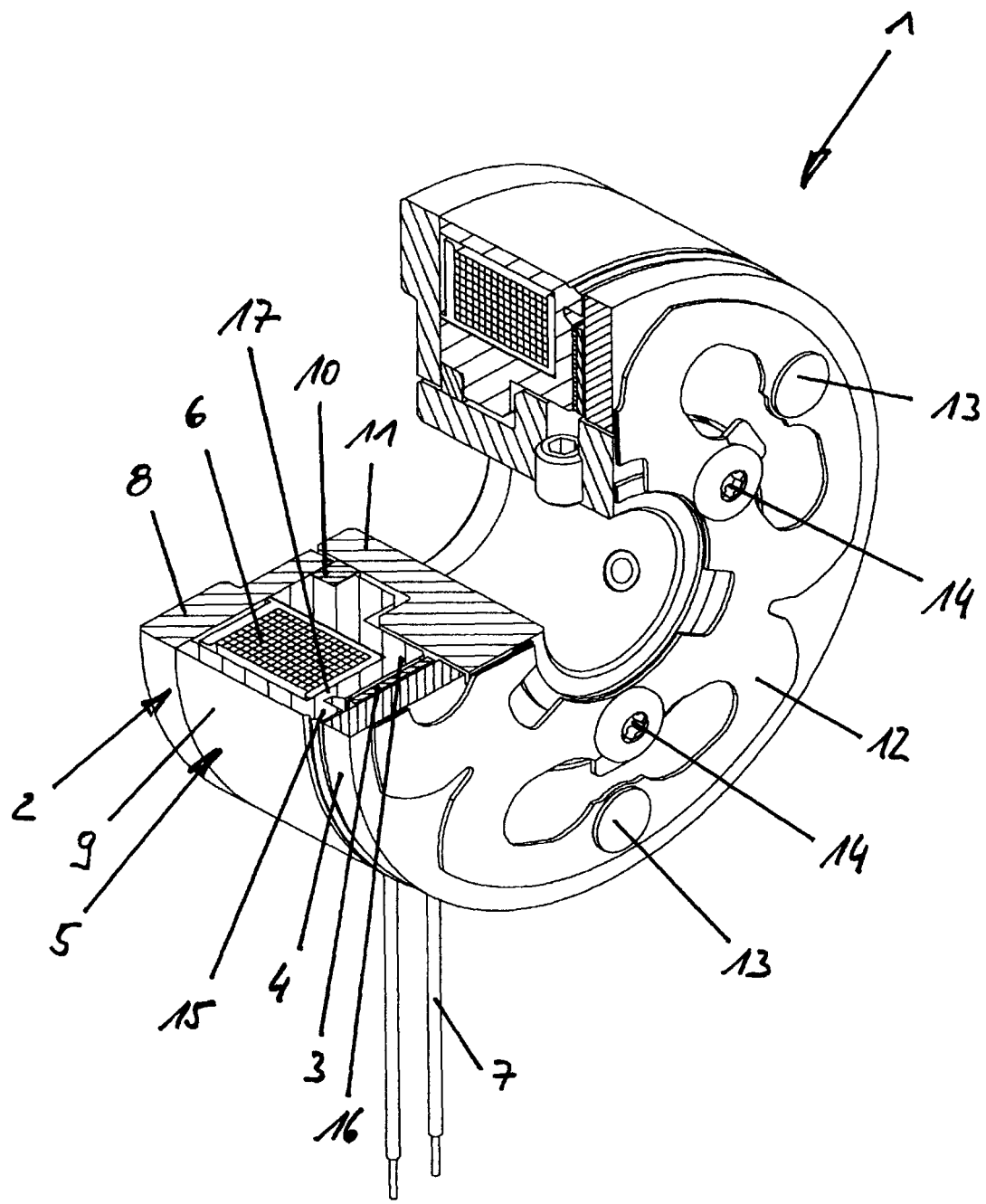
FIG. 1 shows in a schematic perspective view a design according to the disclosure using the example of an electromagnetic brake.

The design according to the disclosure is shown in FIG. 1 using the example of an electromagnetic brake 1.

DETAILED DESCRIPTION

The electromagnetic brake 1 comprises in the manner known per se an electromagnet 2, a permanent magnet 3 and an armature plate 4 that interacts with the electromagnet 2 and the permanent magnet 3. The armature plate 4 is also arranged in a manner known per se on a hub body 11 so as to be fixed against rotation, but nevertheless axially displaceable. The hub body 11 can in turn be mounted in a manner not further shown in the Figures.

For the purpose of a non-rotating, yet axially displaceable arrangement of the armature plate 4 on the hub body 11, the armature plate 4 is fastened to the hub body 11 with the interposition of a spring element 12. The spring element 12 is arranged on the armature plate 4 by means of rivets 13 and is detachably connected to the hub body 11 by means of screws 14.

The electromagnet 2 has a magnet housing 5 and a coil 6 received by it. The magnet housing 5 is designed in two parts and has a magnet pot 9 on the one hand and a flange 8 on the other hand, which is preferably screwed to it in the final assembled state. A cable connection 7 is provided to supply the coil 6 with power.

On the hub body side, the magnetic pot 9 is equipped with a circumferential groove into which an annular wiper 10 is inserted in the final assembled state.

Figure 2:
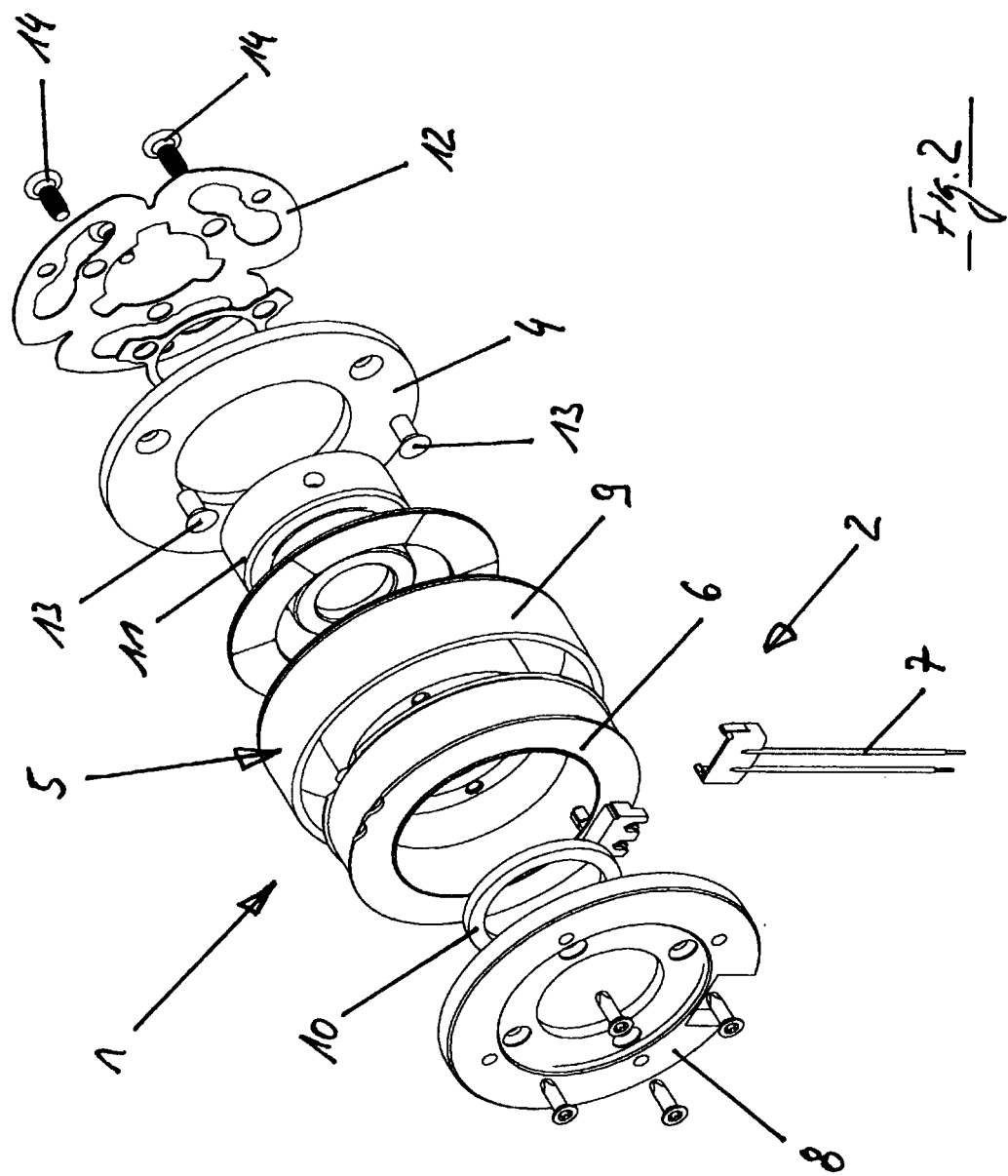
FIG. 2 shows in a schematic exploded view the electromagnetic brake according to FIG. 1.

The structure of the electromagnetic brake 1 according to the disclosure, as explained above, results in particular from a synopsis of FIGS. 1 and 2.

Figure 3:
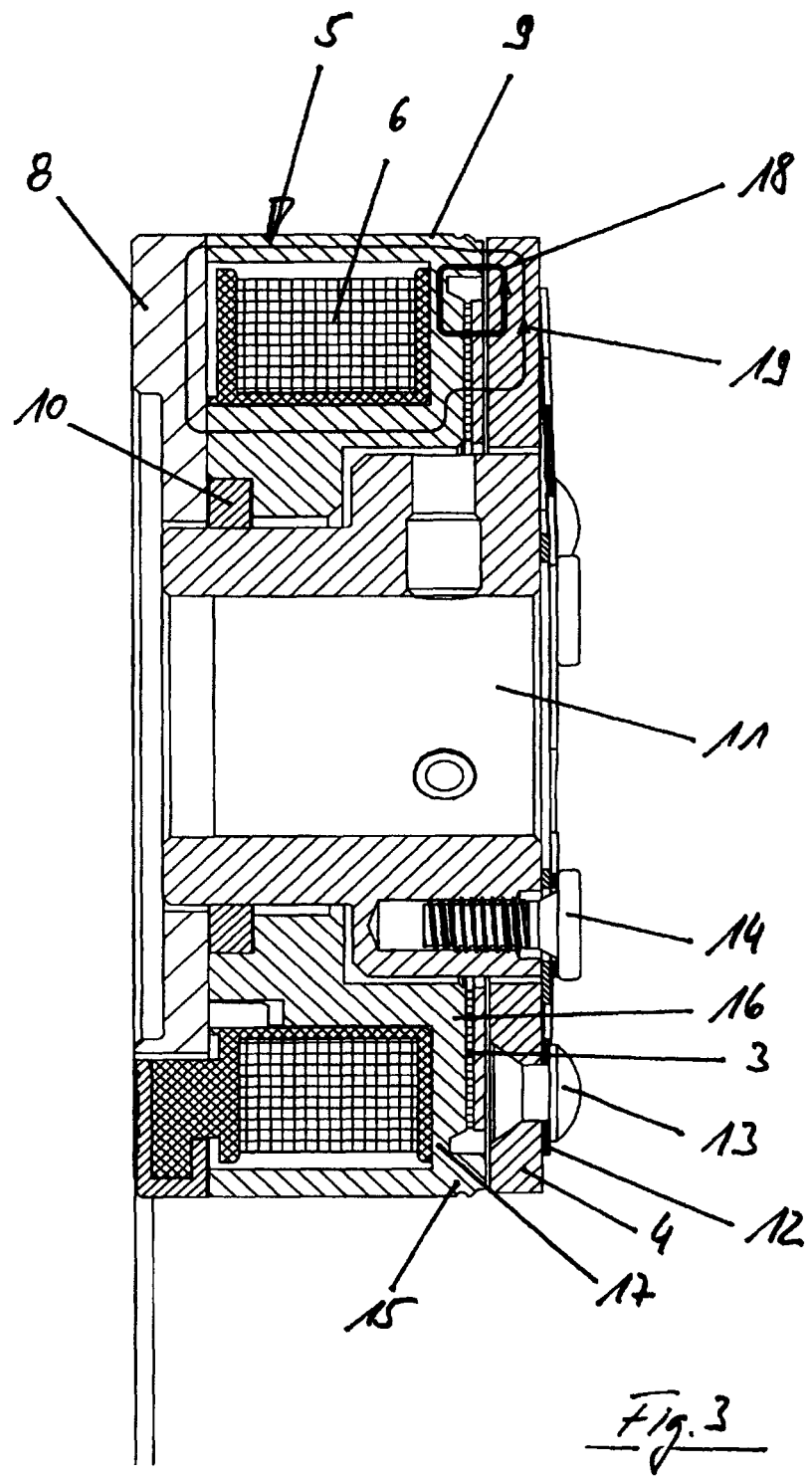
FIG. 3 shows in a partial sectional view the electromagnetic brake according to FIGS. 1 and 2.

A synopsis of FIG. 1 with FIG. 3 in particular also shows that the magnet housing 5, and specifically the magnet pot 9, has an outer ring body 15 providing an external pole and an inner ring body 16 providing an internal pole on the armature plate side. In accordance with the disclosure, a web 17 connecting the inner ring body 16 to the outer ring body 15 is arranged between the inner ring body 16 and the outer ring body 15. This web 17 serves as a magnetic flux bridge between the two poles, i.e. the external pole provided by the outer ring body 15 on the one hand and the internal pole provided by the inner ring body 16 on the other hand.

According to the disclosure, it is also provided that the inner ring body 16 carries the permanent magnet 3 on the armature plate side. The permanent magnet 3 is provided by a ring body which is aligned parallel to the armature plate 4 with regard to its large sides and can also be formed in several parts if necessary. The axial dimension of the permanent magnet 3 is thus smaller than its cross-sectional thickness between its inside diameter and its outside diameter.

Due to the web 17 provided between the outer ring body 15 and the inner ring body 16 according to the disclosure, the magnetic resistance between the two magnetic poles of the permanent magnet 3 is minimized. In contrast to the designs known from prior art, no secondary air gap is formed between the ring bodies, which leads to a reduction in the magnetic resistance. As a result, the efficiency of the coil 6 can be increased. Furthermore, since no undesirable magnetic shunts are built up in the housing, there is a reduced use of magnetic material and thus a reduction in costs. Preferably, the magnetic pot 9 is made of a soft-magnetic material.

FIG. 3 also shows the magnetic flux of the permanent magnet 3 by means of the arrows 18 and 19, namely on the one hand the magnetic flux 18 via the web 17 and on the other hand the magnetic flux 19 via the magnet housing 5. FIG. 3 shows the armature plate 4 in the open position with the coil 6 not energized.

Figure 4:
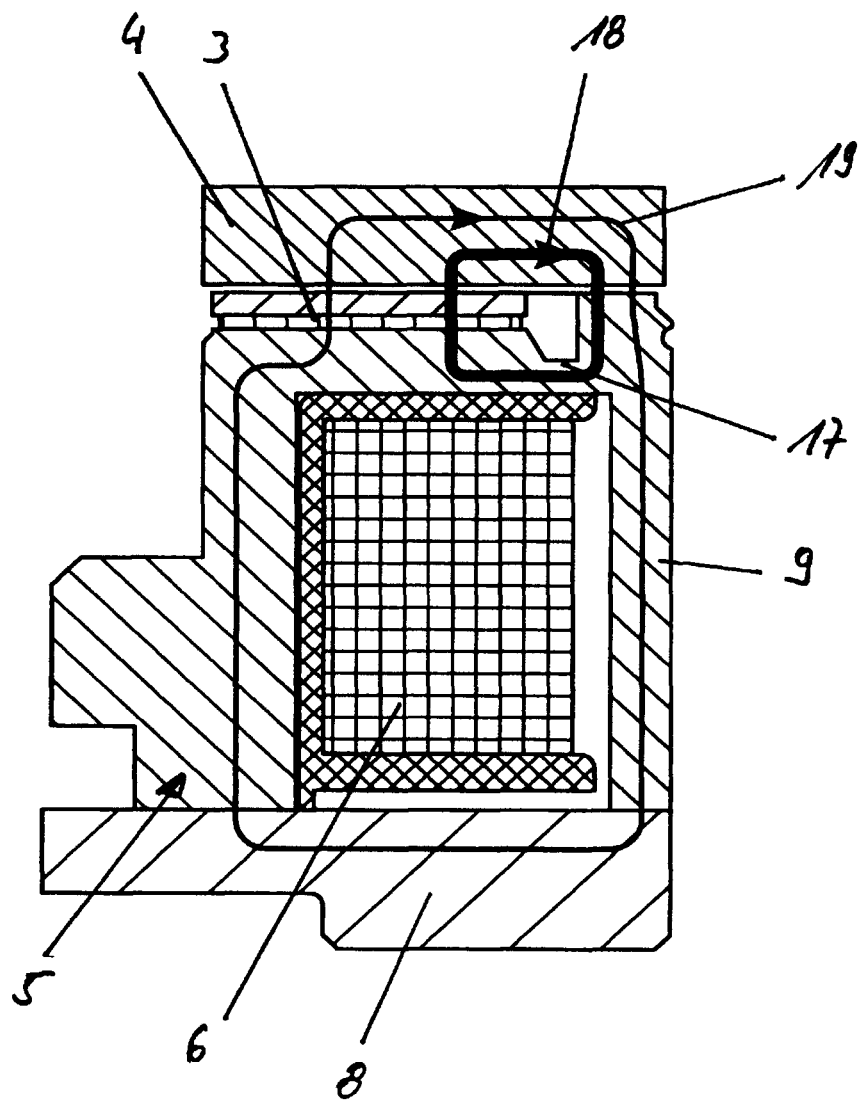
FIG. 4 shows in a schematic representation an and attraction process with the armature plate opened and the coil de-energized.

FIG. 4 also schematically shows the magnetic flux when the armature plate 4 is open and the coil 6 is not energized. The magnetic flux is also shown in correspondence with the arrows 18 and 19.

Figure 5:
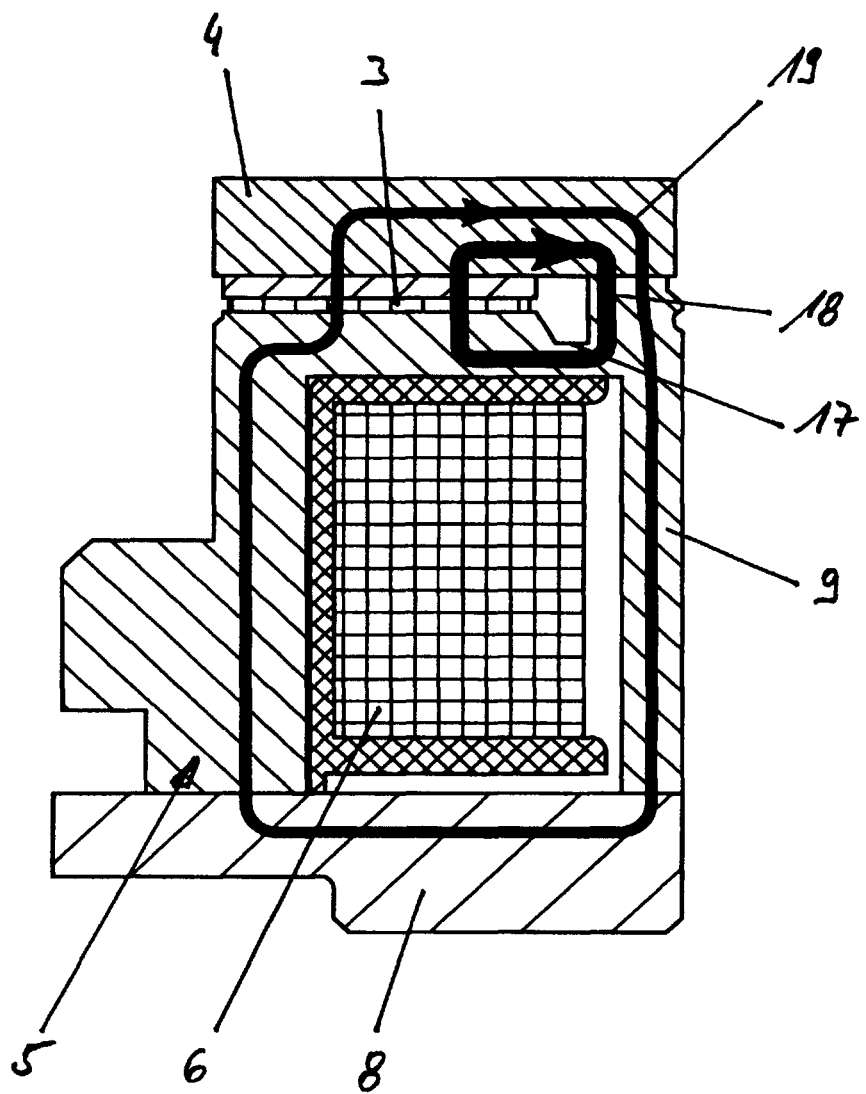
FIG. 5 shows in a schematic representation a brake/stop operation with the armature plate closed and the coil de-energized.

FIG. 5 shows a schematic representation of a braking or stopping operation, according to which the armature plate 4 is closed and the coil 6 is not energized. Here, too, the magnetic flux is established in accordance with arrows 18 and 19, whereby the proportion of the direct magnetic flux 18 via the web 17 is increased compared to the open position of the armature plate 4 according to FIG. 4, which is symbolized by the line thickness of arrow 18.

As can be seen from a synopsis of FIG. 4 with FIG. 5, a direct, short and parallel long magnetic circuit with low resistance is established. The portion of the direct magnetic flux over the web is determined by the web thickness. Due to the design, 80% of the torque is applied to the external pole, for example, which facilitates heat dissipation. Furthermore, a more efficient use of the permanent magnet can be achieved, as can be seen in particular in the illustration according to FIG. 5.

Figure 6:
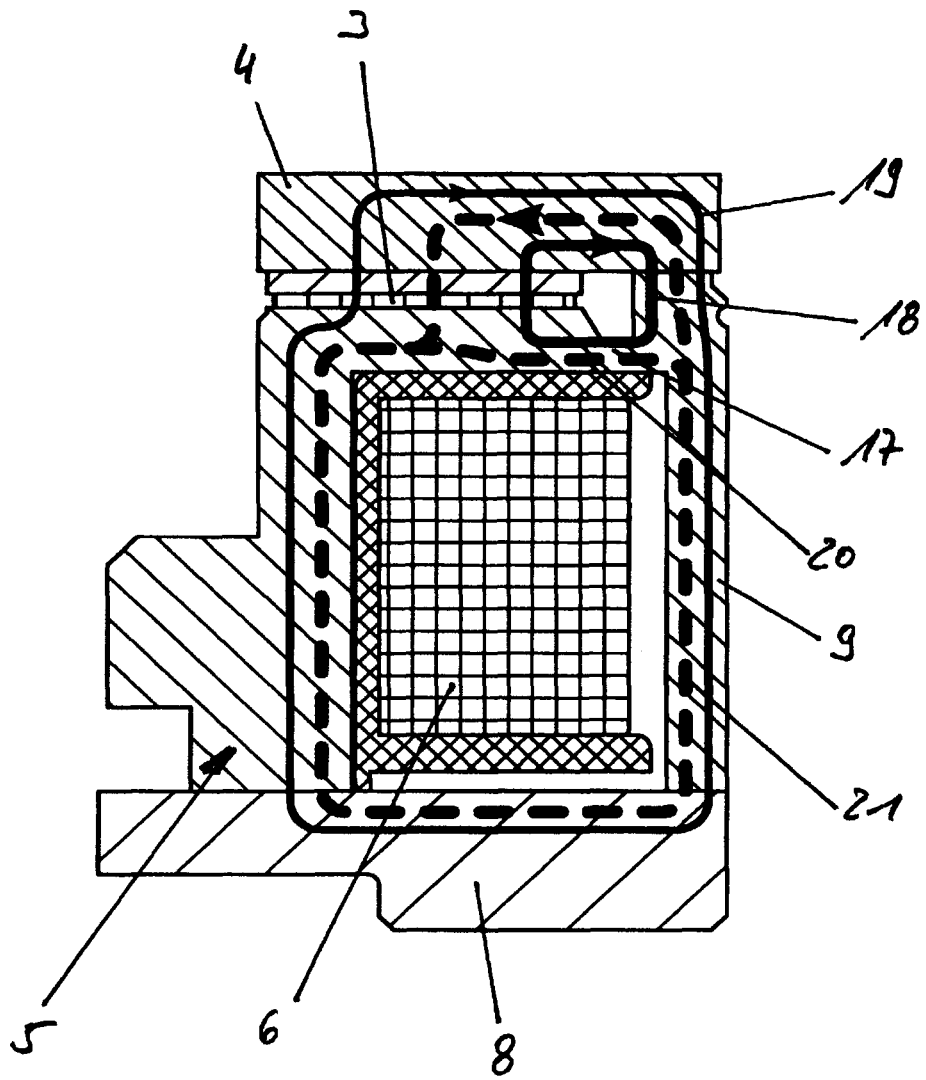
FIG. 6 shows in a schematic representation a release operation with the armature plate closed and the coil energized.

Finally, FIG. 6 shows the situation as it occurs when the armature plate 4 is closed and the coil 6 is energized. This results not only in magnetic fluxes 18 and 19 due to the permanent magnet 3, but also in magnetic fluxes 20 and 21 due to the electromagnet 2. In correspondence with the arrows 20 and 21, a magnetic flux 21 occurs both via the magnet housing 5 and a magnetic flux 20 via the web 17. FIG. 6 specifically shows the releasing process, whereby an opposite polarity of the coil and permanent magnet circuit is established in the pole faces and in the long magnetic circuit, and an equal polarity is established in the short magnetic circuit.

The invention claimed is:

1. An electromagnetic brake or clutch having an electromagnet, a permanent magnet and an armature plate interacting with the electromagnet and the permanent magnet, which armature plate is arranged on a hub body so as to be non-rotatable but nevertheless axially displaceable, the electromagnet having a magnet housing and a coil received therein, wherein the magnet housing has, on the armature plate side, an outer ring body providing an external pole and an inner ring body providing an internal pole, wherein the inner ring body carries the permanent magnet on the armature plate side and that a web which serves as magnetic flux bridge and connects the inner ring body to the outer ring body is disposed between the inner ring body and the outer ring body, whereby the outer ring body projects axially beyond the inner ring body towards the armature plate, wherein the permanent magnet carried by the inner ring body terminates flush with the outer ring body on the armature plate side.

2. The electromagnetic brake or clutch according to claim 1, wherein the permanent magnet and/or the outer ring provides a friction surface interacting with the armature plate on the armature plate side, wherein the friction surface is provided by a friction facing applied to the permanent magnet and/or the outer ring body.

3. An electromagnetic brake or clutch having an electromagnet, a permanent magnet and an armature plate interacting with the electromagnet and the permanent magnet, which armature plate is arranged on a hub body so as to be non-rotatable but nevertheless axially displaceable, the electromagnet having a magnet housing and a coil received therein, wherein the magnet housing has, on the armature plate side, an outer ring body providing an external pole and an inner ring body providing an internal pole, wherein the inner ring body carries the permanent magnet on the armature plate side and that a web which serves as magnetic flux bridge and connects the inner ring body to the outer ring body is disposed between the inner ring body and the outer ring body, whereby the outer ring body projects axially beyond the inner ring body towards the armature plate, wherein the permanent magnet and/or the outer ring body provides a friction surface interacting with the armature plate on the armature plate side.

4. The electromagnetic brake or clutch according to claim 3, wherein the inner ring body, the outer ring body and the web are formed as one piece.

5. The electromagnetic brake or clutch according to claim 3, wherein the magnet housing comprises a magnet pot which provides the inner ring body, the outer ring body and the web on the armature plate side.

6. The electromagnetic brake or clutch according to claim 3, wherein the magnet pot is formed of a soft-magnetic material.

7. The electromagnetic brake or clutch according to claim 3, wherein the magnet pot is of closed design on the armature plate side.

8. The electromagnetic brake or clutch according to claim 3, wherein the friction surface is provided by a friction facing applied to the permanent magnet and/or the outer ring body.

9. The electromagnetic brake or clutch according to claim 3, wherein the permanent magnet is provided by a ring body whose axial dimension is smaller than its radial cross-sectional thickness between its inner diameter and its outer diameter.

* * * * *